United States Patent [19]
Weemes et al.

[11] Patent Number: 4,582,876
[45] Date of Patent: Apr. 15, 1986

[54] HIGH-IMPACT POLYESTER/STYRENE-MALEIC ANHYDRIDE COPOLYMER BLENDS

[75] Inventors: Doyle A. Weemes, Greeneville; Robert W. Seymour, Kingsport, both of Tenn.

[73] Assignee: Eastman Kodak Company, Rochester, N.Y.

[21] Appl. No.: 648,997

[22] Filed: Sep. 10, 1984

[51] Int. Cl.$^4$ .................. C08L 67/02; C08L 51/04
[52] U.S. Cl. ........................... 525/64; 525/173; 525/176
[58] Field of Search ..................... 525/64, 176

[56] References Cited

U.S. PATENT DOCUMENTS 4,117,034 9/1978 Steffancin ..................... 525/64
4,172,859 10/1979 Epstein ....................... 525/176
4,346,195 8/1982 Hornbaker .................... 525/64
4,388,446 6/1983 Hornbaker .................... 525/64

FOREIGN PATENT DOCUMENTS 81015 6/1983 European Pat. Off. .

Primary Examiner—John C. Bleutge
Assistant Examiner—Patricia Short
Attorney, Agent, or Firm—Malcolm G. Dunn; William P. Heath, Jr.

[57] ABSTRACT

Molding compositions having high impact at low temperatures and which are blends of copolyesters based on poly(1,4-cyclohexylenedimethylene terephthalate) and rubber-modified styrene-maleic anhydride copolymers having at least two rubbery additives that were present during the polymerization of the copolymers.

14 Claims, No Drawings

HIGH-IMPACT POLYESTER/STYRENE-MALEIC ANHYDRIDE COPOLYMER BLENDS

TECHNICAL FIELD

The present invention is directed to high-impact molding compositions which are blends of copolyesters based on poly(1,4-cyclohexylenedimethylene terephthalate) and rubber-modified styrene-maleic anhydride copolymers having at least two rubbery additives that were present during the polymerization of the copolymers.

BACKGROUND ART

U.S. Pat. No. 3,919,354 discloses impact resistant polymers of styrene/maleic anhydride and similar monomers which are prepared by providing a solution of rubber in styrene, initiating polymerization and adding maleic anhydride.

European Patent Application No. 81305750.2, filed Dec. 4, 1981, (U.S. Pat. No. 4,486,570) discloses rubber-modified styrene-maleic anhydride copolymers having at least two different rubbery additives which are present during the polymerization of the copolymers, which preferably represents the rubber-modified styrene-maleic anhydride copolymer used in the present invention.

U.S. Pat. No. 4,346,195 discloses thermoplastic compositions, in intimate admixture, polyethylene terephthalate and a rubber-modified graft copolymer of a vinyl aromatic compound and an $\alpha,\beta$-unsaturated cyclic anhydride.

An object of the invention is to provide molding compositions that have high levels of notched Izod impact strength, especially at low temperatures, while retaining a high level of tensile strength, flexural properties, and heat distortion temperatures.

DISCLOSURE OF THE INVENTION

In accordance with the present invention, we provide a molding composition consisting of a blend of (a) 70 weight percent to 30 weight percent copolyester consisting of repeating units from terephthalic acid, repeating units from 1,4-cyclohexanedimethanol present in the amount of 25 to 90 mol % and repeating units from a second glycol having 2 to 6 carbon atoms present in the amount of 75 to 10 mol %, wherein the total mol % of glycol is equal to 100 mol %, and (b) 30 weight percent to 70 weight percent thermoplastic rubber-modified vinyl aromatic polymer composition having a notched Izod impact strength at 23° C. of at least 3.5 ft.lb./in. and a flexural modulus of no more than 325,000 psi and comprising (1) from 60 to 93% by weight of a nonequimolar copolymer of 70 to 98% by weight based on copolymer of a vinyl aromatic monomer, and from 2 to 30% by weight based on copolymer of an unsaturated dicarboxylic acid moiety copolymerizable therewith, and (2) from 7 to 40% by weight of at least two differing rubbery additives which were present during the copolymerization of the monomers of component (1); wherein said rubbery additives comprise from 5 to 20% by weight based on total composition of at least one high conjugated diene-vinyl aromatic copolymer and from 2 to 20% by weight based on total composition of at least one high vinyl aromatic conjugated diene copolymer, with the further limitations that the at least one high conjugated diene-vinyl aromatic copolymer comprises from about 60 to about 98% by weight of the conjugated diene, and that the at least one high vinyl aromatic conjugated diene copolymer is a block copolymer which comprises a greater amount of vinyl aromatic than conjugated diene monomer.

The molding composition may also comprise 40 weight percent to 60 weight percent copolyester and 60 weight percent to 40 weight percent thermoplastic rubber-modified vinyl aromatic polymer composition and preferably 50 weight percent copolyester and 50 weight percent thermoplastic rubber-modified vinyl aromatic polymer composition.

The rubbery additives in the thermoplastic rubber-modified vinyl aromatic polymer composition generally appear as widely dispersed, relatively small particles in the matrix of the composition.

The aromatic vinyl monomer in the thermoplastic rubber-modified vinyl aromatic polymer composition preferably comprises styrene.

The copolymer of unsaturated dicarboxylic acid moiety of the thermoplastic rubber-modified vinyl aromatic polymer composition preferably comprises maleic acid.

The aforementioned second glycol may comprise ethylene glycol or butylene glycol, with the copolyester comprising 15 to 40 mol % ethylene glycol or butylene glycol.

BEST MODE FOR CARRYING OUT THE INVENTION

The molding composition of this invention is a blend which combines high notched Izod impact strength (i.e., values above 5 foot pounds per inch at 0° C.), especially at low temperatures (i.e., 0° C. or below), with good heat deflection temperatures (i.e., above 65° C. when measured at 264 psi) while retaining a high level of tensile strength (above about 5000 psi), flexural properties (i.e., above about 225,000 psi) which perform well in injection molding and extruded shape applications where high impact strength, especially at low temperatures, is required as in appliance parts and automotive parts. The blend components may be prepared on conventional melt-mixing equipment suitable to the molding plastics involved.

For purposes of the description of this invention, the notched Izod impact test (ASTM D-256) indicates the energy required to break a notched specimen. The specimen, usually ⅛ inch by ½ inch by 2 inches, is clamped in the base of a pendulum testing machine so that it is cantilevered upward, with the notch facing the direction of impact. The notch has a radius of 0.010 inch. The pendulum is released and the force consumed in breaking the specimen is calculated from the height the pendulum reaches on the follow-through. The Izod impact test is calculated as foot-pounds per inch of notch. The Izod value is useful in comparing various types or grades of a plastic. It may indicate the need for avoiding sharp corners in parts made of materials that may prove to be notch sensitive.

The unnotched Izod impact test is the same as described above, with the exception that the specimen is not notched.

Also, for purposes of the description of this invention, the flexural modulus test is described in ASTM D-790; the tensile strength test in ASTM D-638; and the heat deflection temperature (HDT) in ASTM D-648.

The polyesters useful in this invention are copolyesters of poly(1,4-cyclohexylenedimethylene terephthalate), and preferred copolymers are those with ethylene glycol or butylene glycol. The inherent viscosity is measured at a concentration of 0.5% of the polymer in the solvent (60% by weight phenol and 40% by weight of tetrachloroethane). The polymer is dissolved at 125° C. and is measured at 25° C. The inherent viscosity is preferably between 0.4 and 1.5.

EUROPEAN PATENT APPLICATION

The rubber-modified styrene-maleic anhydride copolymers useful in this invention are more specifically described in European Patent Application No. 81305750.2 filed Dec. 4, 1981 (U.S. Pat. No. 4,486,570). The composition is described as comprising a copolymer base resin, preferably a vinyl aromatic compound and an alpha, beta-unsaturated cyclic anhydride, modified by at least two different rubbery additives, wherein at least one, but not all, of the rubbery additives consists of a copolymer from 40 to 95% by weight of a vinyl aromatic monomer and 5 to 60% by weight of a conjugated diene monomer. As pointed out, it is essential that the rubbery additives are present at the time of polymerization of the base copolymer resin because it is believed that greater dispersion of the rubbery additives is thereby achieved and an interaction of the rubbery additives reduces the particle size of the resultant rubber particles precipitated during polymerization of the base copolymer or matrix to provide improved results.

The compositions of the rubber modified styrene-maleic anhydride copolymer comprise (a) from 60 to 93% by weight of a base resin or copolymer of 70 to 98% by weight based on copolymer of a more vinyl aromatic compound and from 2 to 30% by weight based on copolymer of an ethylenically unsaturated dicarboxylic acid moiety that have been copolymerized in the presence of (b) from 7 to 40% by weight of at least two differing rubbery additives. The rubbery additives comprise 5 to 20% by weight based on total composition of at least one high conjugated diene-vinyl aromatic copolymer and from 2 to 20% by weight based on total composition of at least one high vinyl aromatic conjugated diene copolymer, with the further limitations that the at least one high conjugated diene-vinyl aromatic copolymer comprises from about 60 to about 98% by weight of the conjugated diene, and that the at least one high vinyl aromatic conjugated diene copolymer is a block copolymer which comprises a greater amount of vinyl aromatic than conjugated diene monomer. These rubbery additives are generally soluble in the vinyl aromatic compound.

The ethylenically unsaturated dicarboxylic acid moiety may be an acid itself, its anhydride, its imide or substituted imides or a half acid derivative of such a dicarboxylic acid or mixtures thereof. Suitable acids and their derivatives useful in the present invention are maleic acid, fumaric acid, itaconic acid, citraconic acid, mesaconic acid, ethylmaleic acid, methyl itaconic acid, chloromaleic acid, dichloromaleic acid, bromomaleic acid, dibromomaleic acid, and phenylmaleic acid, the anhydrides of these acids, the imides and N-substituted imides of these acids, or the half esters of these acids with suitable alcohols. The alcohol used may be the primary and secondary alkanols containing up to 6 carbon atoms, such as methyl alcohol, ethyl alcohol, n-propyl alcohol, sec-butyl and n-pentyl alcohol; halogenated alcohols having up to 6 carbons such as 2,3-dichloro-1-propanol, and 2-bromo-1-propanol; arylalkyl alcohol, such as benzyl alcohol, cyclic alcohols having up to 6 carbon atoms, such as cyclopentanol, cyclohexanol, and tetrahydrofurfuryl alcohol; ether alcohols, such as 2-butoxyethanol and the ethyl ether of diethylene glycol and the like.

The imide derivatives, according to the European Patent Application, may be prepared by reacting the starting anhydride or diacid copolymers with aqueous ammonia or amines. Suitable amines are the alkyl amines having 1 to 4 carbon atoms, such as methylamine, propylamine, isopropylamine and butylamine; ethanolamine; aniline, benzylamine, allylamine and the like. Also suitable are the water soluble $\alpha,\omega$-alkylenediamines having 2 to 6 carbon atoms in the alkylene group, such as ethyleneamine and hexamethylenediamine. Arylene diamines such as phenyl diamines and benzidines may also be used. The diamines are useful for preparing copolymers having varying degrees of cross-linking. These diamines may be used alone or in combination with other monoamines to give varying degrees of crosslinking.

Suitable vinyl aromatic comonomers include styrene, alpha-methylstyrene, nuclear methylstyrenes, ethylstyrene, isopropylstyrene, tert-butylstyrene, chlorostyrenes, dichlorostyrenes, vinylnaphthalene and mixtures of these.

HIGH DIENE RUBBERY ADDITIVES

Suitable rubbery additives or elastomers include diene rubbers which contain at least 50% by weight of a conjugated 1,3-diene. These include conjugated 1,3-diene rubbers, styrene-diene copolymer rubbers, acrylonitrile-diene copolymer rubbers, ethylenepropylene-diene terpolymer rubbers, acrylate-diene copolymer rubbers and mixtures thereof. Preferred rubbers are diene rubbers such as homopolymers of conjugated dienes such as butadiene, isoprene, chloroprene, and piperylene and copolymers of such dienes with up to 50 mole percent of one or more copolymerizable monoethylenically unsaturated monomers, such as styrene, substituted styrenes, acrylonitrile, methacrylonitrile and isobutylene. Also suitable are the graded block copolymer rubbers and A-B block copolymer rubbers containing 70 to 95% by weight of butadiene and 5 to 30% by weight of styrene.

The diene block copolymer rubbers suitable for the present invention are block copolymers of vinyl aromatic compounds and conjugated dienes wherein the blocks of conjugated dienes will have average molecular weights greater than the molecular weight of the combined blocks of vinyl aromatic compounds.

These block copolymers will generally be 2 to 50% by weight vinyl aromatic compound and 50 to 98% by weight conjugated diene. Preferably, the vinyl content will be 10 to 40% with the diene content of 60 to 90%. The vinyl aromatic compounds may be styrene, alpha methylstyrene, nuclear methylstyrenes, ethylstyrene, isopropylstyrene, tert-butylstyrene, chlorostyrenes, dichlorostyrenes and vinyl naphthalene and the like. The preferred compound is styrene.

The conjugated diene may be butadiene, isoprene, chloroprene and piperylene. The preferred dienes are butadiene and isoprene.

Suitable block copolymer rubbers are the graded block, A-B diblock, the radial or star block, A-B-A triblock and the A-B-A hydrogenated triblock rubbers.

All of the block copolymer rubbers can be made by known processes involving anionic initiators such as butyl lithium.

Graded diblock rubbers are those A-B type block copolymers in which each A block is essentially polymerized vinyl aromatic monomer with a minor amount of a conjugated diene, and each B block is essentially a conjugated diene polymer with a minor amount of vinyl aromatic monomer. Such graded block rubbers may be prepared by polymerizing a mixture of the vinyl aromatic monomer and the diene in a neutral solvent, such as n-hexane, using a sec-butyl lithium catalyst. In this type of system, the initial polymer chains are predominantly polydiene, but as the diene is depleted, the later polymer formed is predominantly polyvinyl aromatic monomer. Such copolymer rubbers are also available commercially, as for instance Stereon 720, a Firestone Synthetic Rubber & Latex Co. product having 90% by weight butadiene and 10% by weight styrene with 55% by weight of the styrene appearing as polystyrene blocks.

Diblock copolymer rubbers are copolymers of A-B type wherein A represents a block of poly(vinyl aromatic monomer) and B represents a block of poly(conjugated diene). True diblock copolymer rubbers are made by polymerizing one of the monomers to essential completion and then adding the second monomer. Thus, butadiene may be anionically polymerized using secbutyl lithium catalyst. Then, prior to termination of the polymer chains, the styrene is added and polymerization allowed to continue. Diblock copolymers may also be prepared by separately polymerizing each monomer in the presence of a lithium catalyst and then combining the separate blocks by reacting the lithium terminated blocks together in the presence of a difunctional coupling agent. Such diblock rubbers are also available commercially, as for instance Solprene 1205, a Phillips Petroleum Company product having 75% by weight polybutadiene and 25% by weight polystyrene.

Radial or star block copolymer rubbers are branched copolymers having at least three A-B diblock chains connected to a central nucleus. Thus, chains of block copolymers prepared by polymerizing vinyl aromatic monomers and conjugated diene monomers in inert solvents using organo-lithium catalysts can be added, while still lithium terminated, to compounds having at least three functional sites capable of reacting with the lithium to carbon bond and adding to the carbon possessing this bond in the copolymer. Such polyfunctional compounds are, for example, polyepoxides, polyisocyanates, polyimines, polyaldehydes, polyketones, polyanhydrides, polyesters, etc. Such radial block rubbers are also available commercially, as for instance Solprene 406 and Solprene 414, products of Phillips Petroleum Co. having 60% by weight polybutadiene and 40% by weight polystyrene. Another example is Solprene S411P, containing 70% butadiene, 30% styrene and a coupling agent.

Triblock copolymer rubbers are linear copolymers of the A-B-A or B-A-B type, wherein, again, A represents a block of poly(vinyl aromatic monomer) and B represents a block of poly(conjugated diene). Such triblock copolymers can be prepared by sequential addition of the desired monomers into a lithium alkyl initiated polymerization. Another effective method would be to polymerize the diene monomer, for example, in the presence of a difunctional catalyst, such as dilithiostilbene, and then adding the vinyl aryl monomer to form the end blocks. Such triblock copolymer rubbers are also available commercially as, for example, Kraton 1101, a product of Shell Chemical Co. being a polystyrene-polybutadiene-polystyrene triblock rubber having 70% by weight polybutadiene and 30% by weight polystyrene.

Also suitable are the hydrogenated triblock copolymer rubbers formed by, for example, selective hydrogenation of A-B-A triblock type copolymers. Especially suitable are the hydrogenated triblock copolymer rubbers wherein the hydrogenation has been primarily in the polydiene blocks, B. Thus, U.S. Pat. No. 3,595,942 describes the polymers and suitable methods for their hydrogenation such that at least 80% of the aliphatic unsaturation has been reduced by hydrogenation and less than 25% of the aromatic unsaturation of the vinyl aromatic monomer blocks, A, have been hydrogenated. Such copolymers are available commercially as, for example, Kraton G, a product of Shell Chemical Co., being a polystyrene-polyisoprene-polystyrene triblock rubber wherein the polyisoprene portion has been hydrogenated to a poly(ethylene/propylene) copolymer block.

Another preferred rubbery additive is a high cis content 1,4, polybutadiene with 98% cis content, sold under the trademark Taktene 1202.

HIGH VINYL AROMATIC RUBBERY ADDITIVES

Although the high monovinyl aromatic copolymers are not strictly "rubbery," they are designated as rubbery additives herein because of the effect their addition to the present system has on the impact and thermal properties.

Any of the types of block copolymers described above can be prepared using greater amounts of vinyl aromatic monomer than conjugated diene in the described procedures. Those prepared having from 40 to 95% by weight of vinyl aromatic monomers and 5 to 60% by weight of conjugated diene monomers are suitable for use as high vinyl aromatic additives.

Thus, Stereon 840 is a graded diblock copolymer of about 57% by weight butadiene and 43% by weight styrene and is sold by Firestone Synthetic Rubber & Latex Co.

Another suitable high vinyl aromatic rubbery additive is a radial block copolymer of 75% by weight styrene and 25% by weight butadiene, sold by Shell Chemical Co. under the tradename KR03.

Branched, radial block copolymers, which are also suitable for the present invention, can be prepared using the methods taught in U.S. Pat. No. 4,180,530.

The polymerization of the base resin copolymer may be accomplished by any of the several available methods for the preparation of the non-equimolar copolymers of vinyl aromatic compounds and dicarboxylic acid moieties. They may be prepared in accordance with the principles of the continuous recycle polymerization process such as described in U.S. Pat. Nos. 2,769,804 and 2,989,517; or by the suspension polymerization process described in U.S. Pat. No. 3,509,110. A continuous polymerization process is preferred (even though recycling is only done after purification of the materials), because it appears to lend itself to the advantages of the invention described in the European Patent Application, such as the possibility of the increase of greater rubber content and the energy conservation potential discovered.

For example, in continuous polymerization process there are inherent limitations in that if more than about 15 to 17% by weight of finished product of a rubbery additive is used, the viscosity of the total mix or syrup becomes so high that agitation and continued polymerization cannot be accomplished.

When a total of 20% of at least two different rubbery additives are present during polymerization, it is found that when polymerization reaches a point where the syrup contains about 45% or so solids, the viscosity, which at the start of polymerization was 195 cps, is only 4,870 cps compared to a syrup containing only 15% of one rubber additive which starts with a viscosity of about 95 cps and progresses to where, at the level of 45% or so solids, the viscosity is about 17,430 cps.

This remarkable decrease in viscosity cannot be fully explained but may be accounted for by the fact that the rubber particles precipitating out of the syrup as polymerization proceeds have a much finer particle size than when a single rubbery additive is used.

Similarly in producing compositions described herein, the amperage required at a point near the end of polymerization to drive the agitators decreased from 64 to 66 amperes for a copolymer containing enough of a rubbery additive to provide 15% by weight of the final product to about 60 to 62 amperes for a final product containing 17% of one rubbery additive and 5% of a different rubbery additive for a total of 22% rubbery additive.

In another instance a composition containing 15% of one rubber and 10% of another rubber or a total of 25% rubber only required 59 to 62 amperes at a point near the end of polymerization in contrast to the 64 to 66 amps for a composition containing 15% of a single rubbery additive. On another production line, the composition containing 15% of a single rubber required 70 to 72 amperes to drive the agitator at the time of final polymerization in contrast to a composition containing 17% of one rubber and 5% of another rubber (or a total of 22% rubber) which required only 61½ to 62 amperes. When production planning requires consideration of energy conservation, it is highly advantageous to make a better product while using considerably less energy. (This concludes the pertinent portions of the above-identified European Patent Application.)

The preferred rubber-modified styrene-maleic anhydride copolymer for use with the present invention are those commercially available from ARCO Chemical Company, Division of Atlantic Richfield Company, and are identified as Dylark ® Styrene Copolymer 600 and Dylark ® Styrene Copolymer 700, hereinafter referred to as DYLARK 600 copolymer and DYLARK 700 copolymer. More specifically, the rubber-modified styrene-maleic anhydride for use with this invention must have at least a notched Izod impact strength at 23° C. of at least 3.5 ft.lb./in. and a flexural modulus of no more than 325,000 psi.

DYLARK 600 copolymer is described by ARCO Chemical Company, Division of Atlantic Richfield Company, as having the following properties, the data having been developed under laboratory conditions and although not to be used as specifications, they will serve to more closely identify the copolymer in concern.

| DYLARK 600 Styrene Copolymer | Value | ASTM Method |
|---|---|---|
| Resin Properties | | |
| Specific Gravity, 23/23° C. | 1.05 | D-792 |
| Melt Flow, g/10 min. Condition "L" | 1.1 | D-1238 |
| Physical Properties | | |
| Tensile Strength, psi | 4500 | D-638 |
| Tensile Elongation, percent | 20 | D-638 |
| Tensile Modulus, psi | 270,000 | D-638 |
| Flexural Strength, psi | 8,200 | D-790 |
| Flexural Modulus, psi | 310,000 | D-790 |
| Izod Impact, ft. lb./in. of notch* | 4.0 | D-256 |
| Falling Weight Impact at 73° F. (23° C.) $F_{50}$, in. lb. | 475 | ACC |
| Gardner Impact, in. lb., 73° C. | 118 | |
| Rockwell Hardness, L Scale | 75 | D-785 |
| Mold Shrinkage, in./in. | 0.006 | D-955 |
| Water Absorption, percent | 0.10 | D-570 |
| Thermal Properties | | |
| Vicat Softening Point, °F. | 238 | D-1525 |
| °C. | 114 | |
| Deflection Temp. Under Load** | | |
| °F. @ 264 psi, annealed | 228 | D-648 |
| unannealed | 202 | |
| °C. @ 18.6 kg/cm², annealed | 108 | |
| unannealed | 94 | |
| Coefficient of Linear Thermal Expansion | | |
| in/in/°F. × $10^{-5}$ | 3.7 | D-696 |
| cm/cm/°C. × $10^{-5}$ | 6.7 | |

°C. = Degrees Celsius
*0.125" specimen
**0.5 " × 0.5" × 5" bar annealed at 194° F. (90° C.)

DYLARK 700 copolymer is described by ARCO Chemical Company, Division of Atlantic Richfield Company, as having the following properties, the data also having been developed under laboratory conditions and although not to be used as specifications, they will also serve to more closely identify the copolymer in concern.

| DYLARK 700 Styrene Copolymer | Value | ASTM Method |
|---|---|---|
| Resin Properties | | |
| Specific Gravity, 23/23° C. | 1.05 | D-792 |
| Melt Flow, g/10 min. Condition "L" | 0.8 | D-1238 |
| Physical Properties | | |
| Tensile Strength, psi | 4800 | D-638 |
| Tensile Elongation, percent | 20 | D-638 |
| Tensile Modulus, psi | 280,000 | D-638 |
| Flexural Strength, psi | 8,500 | D-790 |
| Flexural Modulus, psi | 320,000 | D-790 |
| Izod Impact, ft. lb./in. of notch* | 4.4 | D-256 |
| Falling Weight Impact at 73° F. (23° C.) $F_{50}$, in. lb.*** | | |
| Gardner Impact, in. lb., 73° C.*** | | |
| Rockwell Hardness, L Scale | 75 | D-785 |
| Mold Shrinkage, in./in. | 0.006 | D-955 |
| Water Absorption, percent | 0.10 | D-570 |
| Thermal Properties | | |
| Vicat Softening Point, °F. | 241 | D-1525 |
| Deflection Temp. Under Load** | | |
| °F. @ 264 psi, annealed | 235 | D-648 |
| unannealed | 205 | |
| Coefficient of Linear Thermal Expansion | | |
| in/in/°F. × $10^{-5}$ | 3.7 | D-696 |

°C. = Degrees Celsius
*0.125" specimen
**0.5 " × 0.5" × 5" bar annealed at 194° F. (90° C.)
***Information was not available DYLARK 238, 240, 250, and 350 copolymers are also shown below for comparison purposes, as will appear later in other tables.

DYLARK 238 Resin

|  | Value | ASTM Method |
|---|---|---|
| Resin Properties |  |  |
| Specific Gravity, 23/23° C. | 1.08 | D-792 |
| Melt Flow, g/10 min. Condition "L" | 1.5 | D-1238 |
| Physical Properties |  |  |
| Tensile Strength, psi | 7200 | D-638 |
| Tensile Elongation, percent | 2.1 | D-638 |
| Tensile Modulus, psi | 420,000 | D-638 |
| Flexural Strength, psi | 12,200 | D-790 |
| Flexural Modulus, psi | 450,000 | D-790 |
| Izod Impact, ft. lb./in. of notch* | 0.5 | D-256 |
| Falling Weight Impact at 73° F. (23° C.) $F_{50}$, in. lb.*** |  |  |
| Gardner Impact, in. lb., 73° C.*** |  |  |
| Rockwell Hardness, L Scale | 105 | D-785 |
| Mold Shrinkage, in./in. | 0.005 | D-955 |
| Water Absorption, percent | 0.10 | D-570 |
| Thermal Properties |  |  |
| Vicat Softening Point, °F. | 244 | D-1525 |
| Deflection Temp. Under Load** |  |  |
| °F. @ 264 psi, annealed | 235 | D-648 |
| unannealed | 220 |  |
| Coefficient of Linear Thermal Expansion |  |  |
| in/in/°F. × $10^{-5}$ | 3.5 | D-696 |

°C. = Degrees Celsius
*0.125" specimen
**0.5 " × 0.5" × 5" bar annealed at 194° F. (90° C.)
***Information was not available

DYLARK 240 Resin

|  | Value | ASTM Method |
|---|---|---|
| Resin Properties |  |  |
| Specific Gravity, 23/23° C. | 1.06 | D-792 |
| Melt Flow, g/10 min. Condition "L" | 1.0 | D-1238 |
| Physical Properties |  |  |
| Tensile Strength, psi | 5800 | D-638 |
| Tensile Elongation, percent | 14 | D-638 |
| Tensile Modulus, psi | 350,000 | D-638 |
| Flexural Strength, psi | 10,500 | D-790 |
| Flexural Modulus, psi | 370,000 | D-790 |
| Izod Impact, ft. lb./in. of notch* | 1.5 | D-256 |
| Falling Weight Impact at 73° F. (23° C.) $F_{50}$, in. lb.*** |  |  |
| Gardner Impact, in. lb., 73° C.*** |  |  |
| Rockwell Hardness, L Scale | 95 | D-785 |
| Mold Shrinkage, in./in. | 0.005 | D-955 |
| Water Absorption, percent | 0.10 | D-570 |
| Thermal Properties |  |  |
| Vicat Softening Point, °F. | 243 | D-1525 |
| Deflection Temp. Under Load** |  |  |
| °F. @ 264 psi, annealed | 234 | D-648 |
| unannealed | 215 |  |
| Coefficient of Linear Thermal Expansion |  |  |
| in/in/°F. × $10^{-5}$ | 3.7 | D-696 |

°C. = Degrees Celsius
*0.125" specimen
**0.5 " × 0.5" × 5" bar annealed at 194° F. (90° C.)
***Information was not available

DYLARK 250 Resin

|  | Value | ASTM Method |
|---|---|---|
| Resin Properties |  |  |
| Specific Gravity, 23/23° C. | 1.06 | D-792 |
| Melt Flow, g/10 min. Condition "L" | — | D-1238 |
| Physical Properties |  |  |
| Tensile Strength, psi | 4600 | D-638 |
| Tensile Elongation, percent | 20 | D-638 |
| Tensile Modulus, psi | 320,000 | D-638 |
| Flexural Strength, psi | 8700 | D-790 |
| Flexural Modulus, psi | 330,000 | D-790 |
| Izod Impact, ft. lb./in. of notch* | 2.5 | D-256 |
| Falling Weight Impact at 73° F. (23° C.) $F_{50}$, in. lb.*** |  |  |
| Gardner Impact, in. lb., 73° C.*** |  |  |
| Rockwell Hardness, L Scale | 80 | D-785 |
| Mold Shrinkage, in./in. | 0.006 | D-955 |
| Water Absorption, percent | 0.10 | D-570 |
| Thermal Properties |  |  |
| Vicat Softening Point, °F. | 241 | D-1525 |
| Deflection Temp. Under Load** |  |  |
| °F. @ 264 psi, annealed | 234 | D-648 |
| unannealed | 210 |  |
| Coefficient of Linear Thermal Expansion |  |  |
| in/in/°F. × $10^{-5}$ | 3.7 | D-696 |

°C. = Degrees Celsius
*0.125" specimen
**0.5 " × 0.5" × 5" bar annealed at 194° F. (90° C.)
***Information was not available

DYLARK 350 Resin

|  | Value | ASTM Method |
|---|---|---|
| Resin Properties |  |  |
| Specific Gravity, 23/23° C. | 1.08 | D-792 |
| Melt Flow, g/10 min. Condition "L" | 1.0 | D-1238 |
| Physical Properties |  |  |
| Tensile Strength, psi | 5100 | D-638 |
| Tensile Elongation, percent | 10 | D-638 |
| Tensile Modulus, psi | 330,000 | D-638 |
| Flexural Strength, psi | 9800 | D-790 |
| Flexural Modulus, psi | 350,000 | D-790 |
| Izod Impact, ft. lb./in. of notch* | 2.8 | D-256 |
| Falling Weight Impact at 73° F. (23° C.) $F_{50}$, in. lb.*** |  |  |
| Gardner Impact, in. lb., 73° C.*** |  |  |
| Rockwell Hardness, L Scale | 80 | D-785 |
| Mold Shrinkage, in./in. | 0.005 | D-955 |
| Water Absorption, percent | 0.10 | D-570 |
| Thermal Properties |  |  |
| Vicat Softening Point, °F. | 266 | D-1525 |
| Deflection Temp. Under Load** |  |  |
| °F. @ 264 psi, annealed | 248 | D-648 |
| unannealed | 225 |  |
| Coefficient of Linear Thermal Expansion |  |  |
| in/in/°F. × $10^{-5}$ | 3.7 | D-696 |

°C. = Degrees Celsius
*0.125" specimen
**0.5 " × 0.5" × 5" bar annealed at 194° F. (90° C.)
***Information was not available The invention is further illustrated but not limited by the following examples.

For Table 1 below, the blends were compounded by extrusion in the ratios shown and molded on a New Britain machine. Unexpectedly the blends with DYLARK 600 styrene copolymer, which are within the scope of this invention, were superior to the others. (DYLARK 700 styrene copolymer was found to perform nearly similarly to DYLARK 600 styrene copolymer.) They are characterized by high notched Izod impact strengths combined with good modulus and an improved heat distortion temperature relative to the polyester. Other styrene-based polymers which do not have both rubber and maleic anhydride modifications do not show these unexpected results, as may be seen in this table. Especially surprising, and of special utility, is the 50/50 blend which shows very high impact strength, even at −29° C. This value is higher than that found in either of the controls.

Polystyrene 656D contains no maleic anhydride or rubber but does contain styrene. DYLARK 232 styrene copolymer contains styrene and maleic anhydride, but does not contain rubber.

For Table 2 below, the blends were again compounded by extrusion in the ratios shown and molded on a New Britain machine. Again, the blends with DYLARK 600 styrene copolymer showed unexpectedly high properties, especially impact strength, relative to the other styrene-based materials which do not contain maleic anhydride and rubber. The especially surprising

TABLE 1

Properties of Polyester(1)/Styrene-Based Copolymer Blends

| Composition | I.V.* (after molding) | Tensile, psi Yield | Tensile, psi Break | % Elon. at Break | Flexural, psi Strength × $10^3$ | Flexural, psi Modulus × $10^5$ | Notched Izod ft./lb./in. 23° C. | Notched Izod ft./lb./in. 0° C. | Notched Izod ft./lb./in. −29° C. | HDT**, °C. 66/264 psi |
|---|---|---|---|---|---|---|---|---|---|---|
| Polyester(1)/10 wt. % DYLARK 600(2) | 0.67 | 6040 | 5820 | 204 | 9.88 | 2.63 | 25.9 | 2.6 | 1.7 | 77/62 |
| Polyester(1)/25 wt. % DYLARK 600(2) | 0.65 | 6080 | 4620 | 108 | 10.25 | 2.85 | 23.4 | 8.3 | 2.8 | 78/65 |
| Polyester(1)/50 wt. % DYLARK 600(2) | 0.61 | 5860 | 4370 | 50 | 10.43 | 3.00 | 18.5 | 12.8 | 13.1 | 78/65 |
| Polyester(1)/75 wt. % DYLARK 600(2) | 0.46 | 5450 | 4300 | 32 | 9.98 | 3.20 | 11.2 | 7.3 | 6.3 | 90/70 |
| Polyester(1)/20 wt. % Lustrex 3350(3) | 0.66 | 6440 | 4780 | 120 | 10.88 | 2.87 | 2.0 | 1.5 | 0.8 | 76/68 |
| Polyester(1)/40 wt. % Lustrex 3350(3) | 0.63 | 6130 | 4590 | 92 | 10.98 | 3.20 | 2.7 | 1.3 | 0.6 | 82/73 |
| Polyester(1)/50 wt. % Lustrex 3350(3) | 0.61 | 5850 | 4470 | 37 | 11.05 | 3.25 | 2.8 | 2.5 | 2.4 | 86/72 |
| Polyester(1)/80 wt. % Lustrex 3350(3) | 0.52 | 5230 | 4900 | 30 | 10.18 | 3.63 | 1.3 | 1.1 | 1.3 | 81/74 |
| Polyester(1)/20 wt. % Styron 656D(4) | 0.70 | 7470 | 5110 | 139 | 11.67 | 3.03 | 0.6 | 0.6 | 0.6 | 80/70 |
| Polyester(1)/40 wt. % Styron 656D(4) | 0.68 | — | 5380 | 3 | 9.95 | 3.89 | 0.2 | 0.3 | 0.2 | 86/76 |
| Polyester(1)/50 wt. % Styron 656D(4) | 0.66 | — | 5690 | 3 | 9.61 | 4.31 | 0.2 | 0.3 | 0.2 | 86/76 |
| Polyester(1)/80 wt. % Styron 656D(4) | 0.60 | — | 5800 | 3 | 11.72 | 4.96 | 0.3 | 0.3 | 0.2 | 88/78 |
| Polyester(1)/90 wt. % DYLARK 232(5) | 0.68 | — | 6650 | 3 | 13.97 | 4.58 | 0.2 | 0.2 | 0.2 | 108/96 |
| Polyester(1)/75 wt. % DYLARK 232(5) | 0.68 | — | 6700 | 3 | 12.59 | 4.58 | 0.2 | 0.2 | 0.2 | 108/82 |
| Polyester(1)/50 wt. % DYLARK 232(5) | 0.71 | — | 8640 | 5 | 16.31 | 3.91 | 0.2 | 0.2 | 0.2 | 103/84 |
| DYLARK 600(2) Control | 0.49 | 4800 | 4090 | 14 | 9.01 | 3.27 | 4.3 | 3.1 | 2.8 | 101/86 |
| Polyester(1) Control | 0.72 | 5850 | 5860 | 202 | 9.67 | 2.50 | 2.7 | 2.7 | 2.5 | 77/62 |

(1) Polyester from terephthalic acid, 19 mole % ethylene glycol, 81 mole % 1,4-cyclohexanedimethol
(2) DYLARK 600 styrene copolymer, a product of ARCO Chemical Company, Division of Atlantic Richfield Company
(3) LUSTREX Polystyrene 3350, a product of Monsanto Plastics & Resins Co., a unit of Monsanto Company
(4) STYRON Polystyrene 656D, a product of Dow Chemical U.S.A., an operating unit of the Dow Chemical Company
(5) DYLARK 232 styrene copolymer, a product of ARCO Chemical Company, Division of Atlantic Richfield Company
*I.V. = inherent viscosity
**HDT = heat distortion temperature In Table 1 above, DYLARK 600 styrene copolymer contains rubber, styrene, and maleic anhydride. LUSTREX Polystyrene 3350 contains rubber and styrene but does not contain any maleic anhydride. STYRON high impact strength at low temperature of the 50/50 blend noted in the discussion of Table 1 also occurs here.

TABLE 2

Properties of Polyester(1)/Styrene-Based Copolymer Blends

| Composition | I.V.* (after molding) | Tensile, psi Yield | Tensile, psi Break | % Elon. at Break | Flexural, psi Strength × $10^3$ | Flexural, psi Modulus × $10^5$ | Notched Izod ft./lb./in. 23° C. | Notched Izod ft./lb./in. 0° C. | Notched Izod ft./lb./in. −29° C. | HDT**, °C. 66/264 psi |
|---|---|---|---|---|---|---|---|---|---|---|
| Polyester(1)/10 wt. % DYLARK 600(2) | 0.67 | 6210 | 4860 | 132 | 10.24 | 2.98 | 6.0 | 1.9 | 2.0 | 72/62 |
| Polyester(1)/25 wt. % DYLARK 600(2) | 0.64 | 6200 | 4640 | 123 | 10.39 | 2.86 | 20.6 | 2.7 | 2.1 | 76/63 |
| Polyester(1)/50 wt. % DYLARK 600(2) | 0.59 | 5900 | 4290 | 28 | 10.41 | 3.11 | 16.8 | 13.1 | 10.5 | 75/65 |
| Polyester(1)/75 wt. % DYLARK 600(2) | 0.55 | 5470 | 4210 | 36 | 10.06 | 3.22 | 19.0 | 6.8 | 5.9 | 94/73 |
| Polyester(1)/20 wt. % Lustrex 3350(3) | 0.70 | 6750 | 4800 | 80 | 11.17 | 3.11 | 1.3 | 0.9 | 0.8 | 80/71 |
| Polyester(1)/40 wt. % Lustrex 3350(3) | 0.65 | — | 5370 | 8 | 10.07 | 3.40 | 0.4 | 0.3 | 0.3 | 80/70 |
| Polyester(1)/50 wt. % Lustrex 3350(3) | 0.61 | — | 4740 | 5 | 10.98 | 3.46 | 0.3 | 0.3 | 0.3 | 83/72 |
| Polyester(1)/80 wt. % Lustrex 3350(3) | 0.54 | 5470 | 5020 | 14 | 10.89 | 3.62 | 0.6 | 0.4 | 0.4 | 85/74 |
| Polyester(1)/20 wt. % Styron 656D(4) | 0.70 | — | 6250 | 4 | 13.03 | 3.65 | 0.4 | 0.4 | 0.3 | 79/71 |
| Polyester(1)/40 wt. % Styron 656D(4) | 0.69 | — | 6430 | 4 | 11.40 | 4.02 | 0.7 | 0.3 | 0.2 | 79/74 |
| Polyester(1)/50 wt. % Styron 656D(4) | 0.67 | — | 6100 | 3 | 11.62 | 4.26 | 0.3 | 0.4 | 0.2 | 86/80 |
| Polyester(1)/80 wt. % Styron 656D(4) | 0.62 | — | 6480 | 3 | 12.44 | 4.86 | 0.2 | 0.3 | 0.2 | 88/78 |
| Polyester(1)/90 wt. % DYLARK 232(5) | 0.69 | — | 7140 | 3 | 18.83 | 4.97 | 0.3 | 0.4 | 0.3 | 108/96 |
| Polyester(1)/75 wt. % DYLARK 232(5) | 0.70 | — | 7720 | 4 | 18.29 | 4.69 | 0.4 | 0.4 | 0.4 | 108/82 |
| Polyester(1)/50 wt. % DYLARK 232(5) | 0.70 | — | 8990 | 6 | 16.27 | 4.12 | 0.4 | 0.4 | 0.4 | 103/84 |
| DYLARK 600(2) Control | 0.49 | 4880 | 4090 | 14 | 9.01 | 3.27 | 4.3 | 3.1 | 3.1 | 101/86 |

TABLE 2-continued

| Composition | Properties of Polyester(1)/Styrene-Based Copolymer Blends | | | | | | | | | |
|---|---|---|---|---|---|---|---|---|---|---|
| | I.V.* (after molding) | Tensile, psi | | | Flexural, psi | | Notched Izod ft./lb./in. | | | HDT**, °C. 66/264 psi |
| | | Yield | Break | % Elon. at Break | Strength × 10³ | Modulus × 10⁵ | 23° C. | 0° C. | −29° C. | |
| Polyester(1) Control | 0.73 | 6240 | 6410 | 227 | 9.35 | 2.36 | 27.0 | 1.7 | 1.7 | 77/61 |

(1)Polyester from terephthalic acid, 32 mole % ethylene glycol, 68 mole % 1,4-cyclohexanedimethol
(2)DYLARK 600 styrene copolymer, a product of ARCO Chemical Company, Division of Atlantic Richfield Company
(3)LUSTREX Polystyrene 3350, a product of Monsanto Plastics & Resins Co., a unit of Monsanto Company
(4)STYRON Polystyrene 656D, a product of Dow Chemical U.S.A., an operating unit of the Dow Chemical Company
(5)DYLARK 232 styrene copolymer, a product of ARCO Chemical Company, Division of Atlantic Richfield Company
*I.V. = inherent viscosity
**HDT = heat distortion temperature Table 3 below illustrates the impact properties of a blend of polyester and DYLARK 600 styrene copolymer, the polyester composition being identified below, as compared to the polyester by itself. This table illustrates that modifications of the poly(1,4-cyclohexylenedimethylene terephthalate) with glycols other than ethylene are effective.

TABLE 3

| | Impact Properties of Polyester(1)/ DYLARK 600 Styrene Copolymer | | | | |
|---|---|---|---|---|---|
| Composition | I.V.* (after molding) | Notched Izod Impact ft./lb./in. | | | Hardness R/L |
| | | 23° C. | 0° C. | −29° C. | |
| Polyester(1) | 0.88 | 19.0 | 17.9 | 3.3 | 98/39 |
| 50% Polyester(1)/ 50% DYLARK 600 | 0.69 | 21.1 | 20.1 | 17.1 | 87/29 |

(1)terephthalic acid
30 mole % 1,4-butylene glycol
70 mole % 1,4-cyclohexandeimethanol
*I.V. = inherent viscosity Table 4 below shows the effect of the polyester composition on the properties of blends with DYLARK 600 styrene copolymer. The underscored items are for compositions within the scope of the present invention. It should be especially noted that the examples containing isophthalic acid were not effective and did not come within the scope of the present invention. This was surprising to us and unexpected.

TABLE 4

Effect of Polyester Composition on Properties of Blends with DYLARK 600 Styrene Copolymer*

| Polymer Composition | | Notched Izod Impact at 0° C. ft. lb./in. | |
|---|---|---|---|
| Acid | Diol | 50/50 Blend | Control Polyester |
| 100% terephthalic | 100% ethylene glycol | 1.6 | 0.6 |
| 100% terephthalic | 80% ethylene glycol 20% 1,4-cyclohexanedimethanol | 1.6 | 0.7 |
| 100% terephthalic | 69% ethylene glycol 31% 1,4-cyclohexanedimethanol | 6.1 | 0.9 |
| 100% terephthalic | 40% ethylene glycol 60% 1,4-cyclohexanedimethanol | 14.6 | 2.7 |
| 100% terephthalic | 32% ethylene glycol 68% 1,4-cyclohexanedimethanol | 14.1 | 1.7 |
| 100% terephthalic | 19% ethylene glycol 81% 1,4-cyclohexanedimethanol | 12.8 | 2.7 |
| 100% terephthalic | 5% ethylene glycol 95% 1,4-cyclohexanedimethanol | 2.0 | 10.6 |
| 100% terephthalic | 100% 1,4-cyclohexanedimethanol | 1.8 | 10.4 |
| 83% terephthalic 17% isophthalic | 100% 1,4-cyclohexanedimethanol | 0.8 | 2.4 |
| 50% terephthalic 50% isophthalic | 100% 1,4-cyclohexanedimethanol | 2.8 | 1.5 |
| 100% terephthalic | 70% 1,4-cyclohexanedimethanol 30% 1,4-bytylene glycol | 20.1 | 17.9 |

NOTE:
The underscored items above come within the scope of the present invention
*The value of notched Izod impact at 0° C. for DYLARK 600 styrene copolymer is 3.1 foot pounds per inch Due to the increased notched Izod impact strengths of these blends, they will perform well in injection molding and extruded shape applications where high impact strength, especially at low temperature, is required.

The potential application for the above-described blends include automobile bumpers, appliance parts, camera and apparatus housings, and automobile interior trim parts. The properties of toughness, at least moderate heat resistance and good processability, are important for these applications.

Flame retarding additives which can be used for the blended compositions according to the invention comprise a large number of chemical compounds which are well known to those skilled in the art. In general, they contain chemical elements which are used because of their flame retarding capacity; for example, bromine, chlorine, antimony, phosphorus, and nitrogen. Preferably, the flame retarding additives are halogenated organic compounds (brominated or chlorinated), optionally used together with auxiliary compounds sometimes referred to as "synergists," such as antimony trioxide, zinc borate, or the like. Elementary phosphorus or phosphorus compounds such as ammonium polyphosphate are also preferred flame retardants. Other examples include bromine or chlorine containing organic phosphate esters, and the like.

Preferred reinforcing fillers are fiberglass, mineral fillers, particulate fillers such as mica and the like. In general, optimum physical properties can be obtained if glass filaments are employed in amounts of from about 5 to 40 percent by weight, based on the combined weight of glass and resin. Higher amounts, however, can be used.

The blended compositions also may be combined with other polymers to effect changes in properties. For example, polycarbonate may be used to increase temperature resistance.

It is also contemplated by the present invention that the products may also contain colorants, plasticizers, extenders, lubricants, oxidation inhibitors, stabilizers, and the like, provided that they are compatible with the ingredients being used and do not distort the usefulness of such final products to an unsatisfactory degree.

The invention has been described in detail with particular reference to preferred embodiments thereof, but it will be understood that variations and modifications can be effected within the spirit and scope of the invention.

We claim:

1. Molding composition consisting of a blend of
   (a) 70 weight percent to 30 weight percent copolyester consisting of repeating units from terephthalic acid, repeating units from 1,4-cyclohexanedimethanol present in the amount of 25 to 90 mol % and repeating units from a second glycol having 2 to 6 carbon atoms present in the amount of 75 to 10 mol %, wherein the total mol % of glycol is equal to 100 mol %, and
   (b) 30 weight percent to 70 weight percent thermoplastic rubber-modified vinyl aromatic polymer composition having a notched Izod impact strength at 23° C. of at least 3.5 ft./lb./in. and a flexural modulus of no more than 325,000 psi comprising:
      (1) from 60 to 93% by weight of a non-equimolar copolymer of 70 to 98% by weight based on copolymer of a vinyl aromatic monomer, and from 2 to 30% by weight based on copolymer of an unsaturated dicarboxylic acid moiety copolymerizable therewith, and
      (2) from 7 to 40% by weight of at least two differing rubbery additives which were present during the copolymerization of the monomers of component (1) wherein said rubbery additives comprise from 5 to 20% by weight based on total composition of at least one high conjugated diene-vinyl aromatic copolymer and from 2 to 20% by weight based on total composition of at least one high vinyl aromatic conjugated diene copolymer, with the further limitations that said at least one high conjugated diene-vinyl aromatic copolymer comprises from about 60 to about 98% by weight of the conjugated diene, and that said at least one high vinyl aromatic conjugated diene copolymer is a block copolymer which comprises a greater amount of vinyl aromatic than conjugated diene monomer.

2. Molding composition as defined in claim 1 wherein said blend comprises 40 weight percent to 60 weight percent said copolyester and 60 weight percent to 40 weight percent said thermoplastic rubber-modified vinyl aromatic polymer composition.

3. Molding composition as defined in claim 1 wherein said blend comprises 50 weight percent said copolyester and 50 weight percent said thermoplastic rubber-modified vinyl aromatic polymer composition.

4. Molding composition as defined in claim 1 wherein the rubbery additives in said thermoplastic rubber-modified vinyl aromatic polymer composition generally appear as widely dispersed relatively small particles in the matrix of the composition.

5. Molding composition as defined in claim 1 wherein the aromatic vinyl monomer in said thermoplastic rubber-modified vinyl aromatic polymer composition comprises styrene.

6. Molding composition as defined in claim 1 wherein the copolymer of unsaturated dicarboxylic acid moiety of said thermoplastic rubber-modified vinyl aromatic polymer composition comprises maleic acid.

7. Molding composition as defined in claim 1 wherein said second glycol comprises ethylene glycol.

8. Molding composition as defined in claim 1 wherein said second glycol comprises butylene glycol.

9. Molding composition as defined in claim 1 wherein said copolyester comprises 15 to 40 mol % ethylene glycol.

10. Molding composition as defined in claim 2 wherein said copolyester comprises 15 to 40 mol % ethylene glycol.

11. Molding composition as defined in claim 3 wherein said copolyester comprises 15 to 40 mol % ethylene glycol.

12. Molding composition as defined in claim 1 wherein said copolyester comprises 15 to 40 mol % butylene glycol.

13. Molding composition as defined in claim 2 wherein said copolyester comprises 15 to 40 mol % butylene glycol.

14. Molding composition as defined in claim 3 wherein said copolyester comprises 15 to 40 mol % butylene glycol.

* * * * *